MEMORY DEVICE

Filed Dec. 30, 1960

INVENTOR.
NICHOLAS N. WINOGRADOFF
BY
Sughrue, Rothwell, Mion & Zinn
ATTORNEYS 3,060,317
Patented Oct. 23, 1962

3,060,317
MEMORY DEVICE

Nicholas N. Winogradoff, Yorktown Heights, N.Y., assignor to International Business Machines Corporation, New York, N.Y., a corporation of New York Filed Dec. 30, 1960, Ser. No. 79,866
19 Claims. (Cl. 250—217)

The present invention relates to a novel two-state memory device, and more particularly, to a semiconductor-electrolytic cell having various of its characteristics, such as photoluminesence, photovoltage, light absorption, or internal resistance, altered in accordance with the condition of the semiconductor-electrolyte interface surface which may be reversibly changed to a plurality of conditions. This application is a continuation-in-part of U.S. application Serial No. 863,008, filed December 30, 1959, now abandoned by Nicholas Winogradoff, and assigned to the present assignee.

In many of the present day date processing systems, there is a great need for internal memory units comprised of high speed, random access, permanent storage, non-destructive readout binary memory units. The present invention is concerned with a novel semiconductor-electrolytic cell exhibiting these desirable properties. Binary information is stored in the cell by changing the surface condition of the semiconductor material therein to one of two states. Certain characteristics of the cell in turn depend on the physical and chemical condition of the semiconductor surface therein, and may be interrogated so as to determine the information content of this memory unit. For example, the basic semiconductor-electrolytic cell here disclosed allows for the interrogation of its photoluminescence, photovoltaic, internal resistance, or light absorption characteristics, at least one of which may have different values in accordance with the binary information content of the cell. The specific materials found in the cell may be varied so as to emphasize the one characteristic which is to be interrogated. Thus, the four charactertistics above mentioned are not necessarily mutually exclusive in any one cell, but may be present to some degree in each species of the cell although there is one characteristic primarily emphasized which is to be used during the interrogation, or readout operation.

In connection with the phenomena of light absorption, the cell may also be employed as a form of light modulator for varying the amount of incidental light passing through the cell on the long wavelength side of the spectrum.

In any of the species of the cell shown herein, the change in value of its primary characteristic may be directly attributable to the change of the semiconductor surface state which is internal within the cell. The surface state of a semiconductor can normally be permanently modified by mechanical abrasion, chemical treatment, or some other techniques. However, the present invention provides a simple and effective way in which the surface state of a semiconductor can be reversibly changed, at will, between two different conditions so as to effectively store one binary bit. This is here accomplished by applying a fixed voltage of reversible polarity to an electrolytic cell in which the semiconductor material comprises an electrode. The passing of a forming current through the cell in one direction modifies the semiconductor surface so that the primary characteristic of the cell, which is to be later interrogated for readout, is enhanced, while a forming current in the opposite direction may substantially extinguish or reverse the primary characteristic. Upon removing the applied voltage and thus the forming current, the degree of the primary characteristic is characterized by the last polarity condition, and remains high or low for a substantial period of time even during readout until the surface state is again changed by the application of a voltage whose polarity is opposite to that previously applied. Therefore, the electrolytic cell of which the semiconductor material forms a part thus exhibits memory properties with each state characterized by the degree of its primary characteristic.

Accordingly, it is therefore an object of the present invention to provide means for reversibly changing the surface state of a semiconductor material to a plurality of conditions whereby the semiconductive material will exhibit a different degree of photoluminescence, photovoltage, internal resistance or light absorption for each of said conditions.

Another object of the invention is to provide a memory device comprising a semiconductor material having a surface in contact with an electrolyte, together with means for reversibly changing the state of said surface portion to a plurality of conditions.

A further object of the invention is to provide a semiconductor-electrolytic cell memory device in which the information storage means consists of a forming current applied in either of two directions through the cell.

A yet further object of the invention is to provide a memory device comprising semiconductive material having a surface and means for reversibly changing the state of said surface in accordance with binary information, together with means for determining the state of said surface during a readout operation.

A yet further object of the invention is to provide a memory device containing semiconductive material whose degree of photoluminescence is dependent upon the condition of a semiconductor surface as changed by the previous storage of binary information.

Another object of the invention is to provide a memory device in the form of a semiconductor-electrolytic cell whose degree of photovoltage is dependent upon the state of the semiconductor surface as changed by the storage of binary information.

A yet further object of the invention is to provide a memory device in the form of a semiconductor-electrolytic cell whose internal resistance is dependent upon the state of the semiconductor surface as changed by the storage of binary information.

Another object of the invention is to provide a memory device in the form of a semiconductor-electrolytic cell whose light absorption factor is dependent upon the state of the semiconductor surface as changed by the storage of binary information.

One other object of the present invention is to provide a device for modulating light passing therethrough.

These, and other objects of the invention, will be pointed out in the following description, which is to be taken in accompaniment with the drawings, in which.

Figure 1:
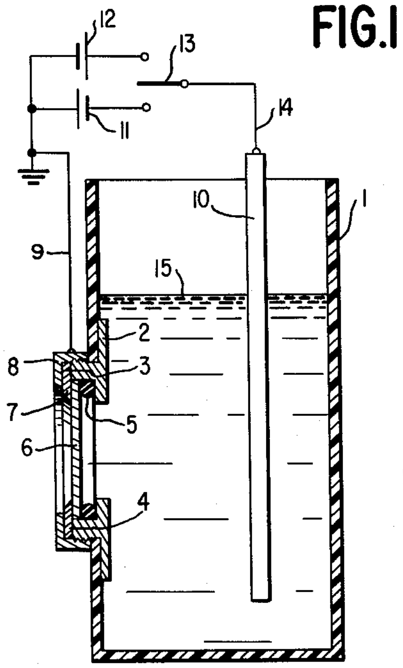
FIGURE 1 is a cross sectional view of the typical semiconductive-electrolytic cell of the present invention together with a diagrammatic representation of means for reversibly changing the surface state of the semi-conductive material therein.
Figure 4:
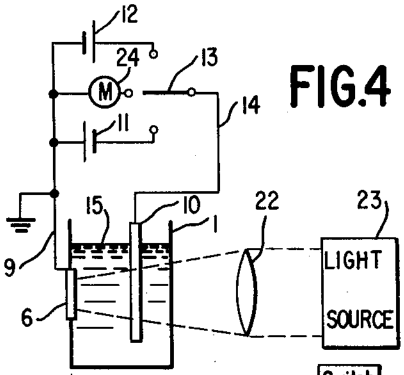
Figure 3:
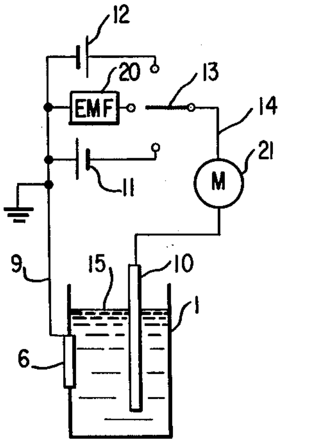
Figure 5:
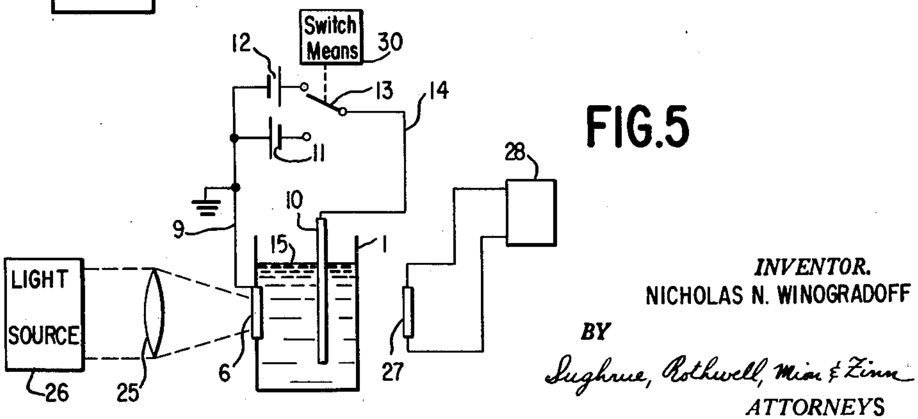

FIGURE 3 discloses the cell of FIGURE 1 in circuit with interrogation means responsive to the internal resistance of the cell;

FIGURE 4 shows the cell of FIGURE 1 in circuit with interrogation means responsive to the photovoltage of the cell; and FIGURE 5 shows the cell of FIGURE 1 in circuit with interrogation means responsive to the light absorption factor of the semiconductor material, which may be employed either as a memory or as a light modulator.

FIGURE 1 shows a preferred embodiment of the configuration of the semiconductor-electrolytic cell memory of the present invention. This configuration is also shown and claimed in the above identified application of which this is a continuation-in-part. However, other forms, configurations, and containers may be utilized without departing from the spirit of the invention as expressed in the appended claims. FIGURE 1 shows a clear plastic container 1, one side of which is perforated and fitted with a plastic collar 2. A rubber ring 5 is then fitted next to collar 2 with a semiconductor wafer 6 being compressed against ring 5 by a metal screw cap 8, which in turn bears onto a metal washer 7 actually making contact with semiconductor wafer 6. Washer 7 may be prevented from rotating by means of two dowel pins 3 and 4 which project from collar 2 and engage washer 7 as shown in FIGURE 1. An electrical connection is made to screw cap 8, which itself is provided with a center opening allowing optical access to the outer surface of wafer 6. The semiconductor wafer 6 therefore provides a window to the cell and also serves as one electrode thereof. Within container 1 is placed a rod 10 having an electrical connector 14 attached thereto, which serves as the other electrode of the cell. Container 1 is filled with an electrolyte solution 15 which at least occupies the space between the rod 10 and the inner surface of semiconductor wafer 6 so as to make physical contact with said semiconductor surface at the interface between them. Rod 10 makes contact with electrolyte 15. Besides using a liquid optically transparent solution, it is also to be noted that solid optically transparent conductor materials may be placed into contact with the semiconductor surface which performs the same function.

Electrical conductors 9 and 14, which are associated with electrodes 6 and 10, respectively, are connected to a source of reversible polarity potential so as to cause their functions of cathode and anode to be selectively interchanged. For example, a simple arrangement for performing this function is that shown in FIGURE 1 which consists of two batteries 11 and 12 connected in parallel opposing relationship, with each having one terminal commoned with conductor 9. The other terminals of these batteries are respectively selected by single pole, triple throw switch 13 to which is connected conductor 14 of rod 10. Upon switch 13 being moved upwards so as to place battery 12 in circuit, electrode 10 will be at a higher potential than electrode 6, thus causing a conventional current to flow from rod 10 to wafer 6 through electrolyte 15. Conversely, the placing of battery 11 in circuit allows electrode 6 to become higher in potential than electrode 10 and reverse the direction of the current. Switch 13 may be moved to its center position so as to remove the potential difference between electrodes. This reversal of polarity may alternatively be done at suitable speeds by many well known means in the switching art, whereby one polarity represents a binary bit of value 1, while the opposite polarity represents a binary bit of value 0.

Depending upon the direction of the electric field last applied across the semiconductor-electrolyte interface, the surface of the semiconductor at this point will be in one of two conditions. The direction of the field, and thus the forming current, is determined by the position of switch 13. The forming current thus flowing across the interface acts, in conjunction with the electrolyte solution itself, to substantially change the character and state of the inner semiconductor surface and so enhance or diminish the characteristic which is to be interrogated by any one of the four means shown in FIGURES 2 through 5. The forming current may then be removed and the semiconductor surface is "frozen" in this state until subsequently changed by a forming current in the opposite direction. Thus, the cell exhibits memory properties. As before mentioned, the specific materials to be used for wafer 6 and electrolyte 15 may differ depending upon which of the four above-described characteristics is to be examined, so that this particular characteristic is emphasized over the other three. The preferred composition of the electrolytic cell in each of the species of FIGURES 2 through 4 will be described in connection with those figures.

Figure 2:
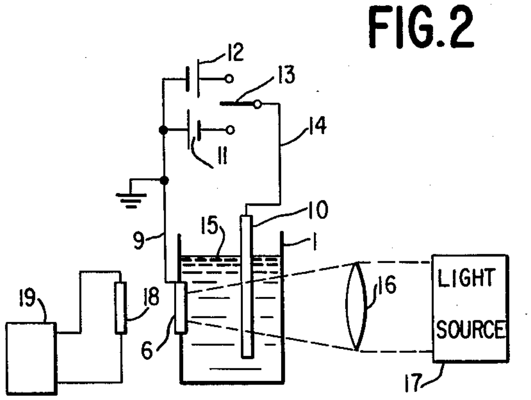
FIGURE 2 shows the cell of FIGURE 1 in circuit with interrogation means responsive to the photoluminescence characteristics of the semiconductor.

Turning now to FIGURE 2, a simplified drawing of the electrolytic cell of FIGURE 1 is shown in combination with interrogating means for determining the degree of photoluminescence exhibited by semiconductor wafer 6, which in turn depends upon the state of its internal surface as characterized by the direction of the forming current last applied across the semiconductor-electrolytic surface. It should be appreciated in FIGURES 2 through 5 that the semiconductor surface forming current need only be utilized when binary information is to be stored within the cell during the write or read-in time, and it is not required to be present during the readout interrogation process because of the memory property exhibited by the semiconductor surface.

The embodiment of the invention of FIGURE 2 has been shown and claimed in the above-identified application of which this is a continuation-in-part. In order to more fully appreciate the interrogation function performed in FIGURE 2, a brief explanation of photoluminescence as found in semiconductor material will first be given. Photoluminescence generally is the emission of light from a substance produced by exposure of the substance to light and which is not describable directly to incandescence. In semiconductor material, the absorption of light photons having energy larger than the energy gap between the valence and conduction bands produces hole-electrons pairs which in turn give rise to photoconductivity. Photoconductivity is the increase in conductivity of a semiconductor due to an increase in the number of current carriers available for the conduction process because of the absorption of light energy. Light energy as here used means photons from the ultraviolet, visible, or infra-red regions of spectrum. The energy of a photon is given by $hf$, where $f$ is its frequency and $h$ is Planck's constant. The quantum efficiency of the absorption process is effectively unity, i.e., one hole-electron pair is produced per photon which is absorbed. When at the end of their lifetime the free electrons and holes so produced recombine, the reverse process may occur so that the energy given up by an electron in the conduction band upon recombination with a hole in the valence band may appear as a photon of light energy. The photons so produced therefore cause the phenomenon of photoluminescence in semiconductor material and are detectable radiation. However, the so-called "surface recombination" of holes and electrons does not produce radiation which becomes a part of the photoluminescence characteristics. Surface recombination is that occurring on or near the semiconductor surface due to surface states or caused by the irregularity of contour or the like. The degree of surface recombination of hole-electron pairs is therefore a sensitive function of the surface state of the semiconductor material. Thus, a change in the semiconductor surface state will result in a change in the rate of surface recombination of carriers freed by highly absorbed light. Since this will also effect the number of carriers available for radiative recombination, a change in the magnitude of photoluminescence of the semiconductor will also be effected. Therefore, the surface state of the semiconductor, as selectively modified by the direction of the forming current through the cell, may yield either a relatively low or a relatively high degree of photoluminescence which thereby is indicative of the direction of the forming current last applied. For each surface condition, as determined by the direction of the forming current, a particular degree of photoluminescence is maintained within a reasonable period of time after cessation of the forming current, even with exposure to an interrogating light, until the surface state is once again changed by a subsequent application of a forming current in a direction opposite to that previously applied. The semiconductor material thus exhibits memory properties as characterized by its degree of photoluminescence, which in turn is indicative of the binary information previously stored into the cell as represented by the direction of the forming current.

Returning now to FIGURE 2, it is seen that external to the electrolytic cell 1 are optical interrogating means comprising condensing lens 16 together with a light source 17. Lens 16 receives rays of light from source 17 and focuses them onto the inner surface of semiconductor wafer 6 which is exposed to the electrolyte solution 15. The spectrum of the light from source 16 must be such that the photons have sufficient energy to cause the generation of excess carriers within the semiconductor material which will give rise to photoluminescence. Rod 10 may be displaced to one side within container 1 so as not to seriously obstruct the light from lens 16 in its passage to wafer 6. A detector 18 is situated opposite the external surface of semiconductor 6 outside of the cell so as to detect the degree of photoluminescence thereof when exposed to the interrogating light from source 17. The output of detector 18 may be fed to any sort of utilization circuit 19, such as an amplifier or logic circuitry. For the maximum "signal to noise" ratio, it is necessary that detector 18 be responsive only to the photoluminescence radiation from wafer 6. Therefore, it is essential that light consisting of photons having energies lower than that of the band gap of the semiconductor are prevented from reaching the semiconductor which is virtually transparent thereto due to the absence of internal absorption. Such low frequency light would pass through wafer 6 and fall on detector 18 which, if sensitive to same, would produce a signal. This condition may be achieved by interposing suitable cut-off filters in the path of the incident light from source 17 which prevent light waves below a certain threshold frequency from falling upon semiconductor wafer 6. In the case of germanium semiconductor material, as used in the preferred embodiment of FIGURE 2, the water comprising the electrolytic solution serves as such a filter for the low frequency light which may emanate from source 17. Otherwise, auxiliary, suitable cut-off or polarization filters must be used for this purpose. It can therefore be appreciated that detector 18 must be positioned and shielded so as to prevent its receiving any light from source 16 to which it might respond, since obviously for maximum efficiency it should be responsive only to the photoluminescence emanating from semiconductor 6.

Since the interrogation means of FIGURE 2 is responsive only to detect and determine the magnitude of photoluminescence from semiconductor wafer 6, the specific material used within the cell should be such as to emphasize this characteristic. Therefore, in the preferred cell embodiment of FIGURE 2, semiconductor wafer 6 may be made of germanium, while the electrolyte 15 is a water solution of cadmium chloride ($CdCl_2$). Since the photoluminescence of germanium is in the infra-red region of the spectrum and its threshold cut-off wavelength is greater than 1.4 microns, detector 18 may be a lead sulfide (PbS) cell. However, by using a different semiconductor material having a wider energy band gap, the photoluminescence wavelength becomes shorter and thus visible. Such a device would then combine both memory and display characteristics. When using germanium as the semiconductor material, source 16 may be an incandescent lamp emitting infra-red radiation. Thus, although the combination of the above two specified materials results in a practical memory cell whose binary information can be determined by photoluminescence, it is not meant to here imply that only this combination and no other may be employed to accomplish the same or similar results. Furthermore, although the characteristic primarily emphasized by the cell in FIGURE 2 is that of photoluminescence, there may also be present certain of the other characteristics such as photovoltage and light absorption. These latter two, however, may not be observable to any practical degree so as to afford a basis for determining the surface state of the semiconductor material. In FIGURE 2, rod 10 may be made of some inert material so as to provide a connection between it and electrolyte 15. Such material may be cadmium, platinum, palladium, or the like.

The operation of FIGURE 2 may be characterized as follows. The excess current carries in wafer 6 are generated photoelectrically by the short wave length radiation from light source 17 which is highly absorbed by the semiconductor material. These current carriers can be considered to be generated in a very thin layer in the vicinity of the interior surface of wafer 6. The photoluminescence radiation, which is generated due to the recombination of these excess current carriers within the interior of wafer 6, may be observed at the exterior surface of wafer 6 by detector 18. The photoluminescence is observed only while the light from source 17 actually falls on the semiconductor. In the particular embodiment of FIGURE 2, the infra-red light emitted by light source 17 is absorbed in the water making up the $CdCl_2$ solution, and the radiation transmitted by the solution is then completely absorbed in the germanium. This also prevents infra-red light having wavelengths greater than the threshold value from being transmitted by the solution to detector 18 as above-described, which should detect only the photoluminescence radiations from the semiconductor.

Depending upon the direction of the forming current last applied across the germanium-$CdCl_2$ interface, the surface of the semiconductor at this point will be in one of two states. The direction of the current applied to this interface is determined by the position of switch 13 in FIGURE 2. For example, if a small negative potential with respect to ground is applied to the electrode 10, thus resulting in a conventional forming current flowing from wafer 6 to rod 10, then semiconductor 6 will exhibit a fairly high degree of photoluminescence upon receipt of light from source 17. This photoluminescence is then detected by 18 whose output is fairly high. The cell exhibits memory characteristics in that the forming current does not need to be present during the actual interrogation time. Thus, in the absence of any potential applied between electrodes, the photoluminescence of the cell is determined by the polarity last applied thereacross, and remains in such a state for a relatively long time until forcibly changed by the application of a different binary bit to the cell.

Upon application of a small postive potential to the rod 10 with respect to ground, the photoluminescence of wafer 6 is substantially destroyed. Furthermore, upon removal of this positive potential from electrode 10, the wafer remains in this particular state. The first state of high photoluminescence may again be created by returning electrode 10 to a potential negative with respect to that of electrode 6.

Light 17 may be a chopped light source which causes wafer 6 to be illuminated by a quick succession of flashes. Since photoluminescence is detected by unit 18 only while radiation is actually falling upon the cell, the use of a chopped light source provides a signal which can be passed through A.C. coupled circuits. For example, using a chopped light source 17 having a frequency of 40 c.p.s. with a 0.4 ohm-centimeter indium doped P-type germanium electrode 6 measuring 0.5 $cm.^2$ in area, the lead sulfide cell 18 produces a 2-millivolt signal. The application of a bias of 2.0 volts across the cell causes the signal to decay with a time constant of less than 0.2 millisecond, while the recovery produced by a reverse bias of the same magnitude yields a build up of the signal characterized by the time constant of 170 milliseconds. It should be emphasized, therefore, that the photoluminescence characteristics of the cell do not appreciably decay with prolonged interrogation of light source 17, so that the readout from this cell is essentially non-destructive in nature. Over a period of a few days, however, the state of the cell may decay whether interrogated or not. This time limit is well without the normal usage of memories found in present data systems, and so, for all practical purposes, can be neglected.

The species of FIGURE 3 will now be described in detail. The electrolytic processes giving rise to the states of photoluminescence in the cell of FIGURE 2 also give rise to marked changes in the internal impedance of the cell if reverse biased, as has been described in the above-identified application of which this is a continuation-in-part. For example, when the cell is in its high photoluminescence condition, then its internal impedance in the reverse biased condition is substantially lower than when it is in a non-photoluminescence condition. These differences in impedance are produced by changes in the surface potential barrier at the semiconductor-electrolyte interface. This phenomenon may be generally described as follows. Upon contact of two dissimilar materials, one of which has a Fermi energy level different from the other, a flow of electrons is initiated from the body having the higher Fermi level to the body with the lower Fermi level. These electrons flowing across the contact area distribute themselves over the surface of the contact or interface, between the two bodies, this giving rise to di-pole layer of surface charge. In the case where one of the materials is a semiconductor having well defined valence and conduction bands, this di-pole layer of surface charge results in the bending of these bands near the contact surface in order to create a potential barrier to the majority current carriers in the semiconductor material. When such a contact area is biased in reverse direction, i.e., the potential barrier is artificially increased in height, then the current flow thereacross depends both upon the density and characteristics of the socalled minority carriers in each of the materials. A change in the semiconductor surface state of the cell in FIGURE 1 alters the surface barrier and thus will affect the internal impedance of the cell when biased in its reverse direction. Consequently, this property as well as photoluminescence may be interrogated to determine the binary contents of the cell. The use of optical interrogation is therefore not essential.

FIGURE 3, therefore, shows the cell of FIGURE 1 having an internal resistance interrogation circuit, as opposed to the optical interrogation shown in FIGURE 2. Cell 1 is provided with means 12 and 11 to apply a forming current in one of two directions across the semiconductor 6-electrolyte 15 interface in order to modify the surface of the semiconductor and so change the surface barrier potential. Upon moving armature 13 away from the biasing batteries 11 and 12, it may be switched to connect a separate source of E.M.F. 20 in series with the cell so as to bias it in reverse direction. Included in the series circuit is a meter 21, which diagrammatically indicates any one of a number of well known ways to measure the internal impedance of cell 1. Thus, meter 21 may indicate the current in the series circuit. The only requirement as to E.M.F. 20 appears to be that it be of such magnitude as to not in itself cause the current flow during interrogation time to actually reverse the surface state of semiconductor wafer 6. Furthermore, cell 1 in FIGURE 3 may be composed of the same materials as is the cell in FIGURE 2, as well as other combinations of semiconductor and electrolytes.

A third method of interrogating the semiconductor surface condition in the basic electrolytic cell of the invention is shown in FIGURE 4, wherein is detected the magnitude of the photovoltage generated across the cell terminals. In order to clarify this operation, a brief definition and description of photovoltage phenomenon in semiconductor devices will be given. Photovoltaic cells comprised of semiconductor material having a rectifying junction therein are well known in the art. Generally, such photovoltaic cells consist of a region of semiconductor material making rectifying contact with a metal, or they may consist of two regions of opposite type conductivity semiconductive material forming a rectifying P-N junction therebetween. As was noted generally in connection with the description of FIGURE 3, upon contact initially being made between semiconductor material metal, a current flows across the junction or contact area in order to balance the charges and equalize the Fermi levels of each of the materials. After this has been performed, thermodynamic equilibrium is maintained in each of the regions and there is no measurable potential difference between these regions, although a contact difference of potential is now present. This is a potential or surface barrier now existing at the contact area which prevents interchange of the majority carriers in each material across the junction. Upon illumination of the semiconductor material where there are well defined valence and conduction bands, certain electrons of the valence band may receive enough energy from the light photons so that they are transported across the energy gap to the conduction band, thus leaving a hole in the valence band. Many of the extra current carriers thus generated by means of photo processes, especially those within the barrier region, are able to surmont the potential barrier, thus charging it up and generating a measurable and substantial E.M.F. across the contact or junction area.

The magnitude of the photovoltage generated upon exposure to light depends upon several factors, among which are the surface recombination rate and the height of the surface potential barrier. The surface recombination rate is important inasmuch as those excess carriers which are recombined at the surface are not effective in crossing over the barrier and thus do not contribute to the photovoltage. Any technique whereby the surface recombination rate is reduced will thereby effectively increase the magnitude of the photovoltage generated across the terminals of the cell. As previously explained in connection with FIGURE 2, surface recombination is a sensitive function of the surface state, as is also the barrier height. Therefore, it is obvious that a change of the surface state due to the forming currents when writing into the cell will effect the magnitude of the photovoltage generated across the terminals of the cell when the cell is illuminated. This state is maintained for a considerable period of time after the removal of the forming current and is not subjected to deterioration during the interrogation. The photovoltaic cell thus exhibits memory properties characterized by a developed bi-level photovoltage.

Referring again to FIGURE 4, there is shown external to the electrolytic cell a condensing lens 22 together with a light source 23. Lens 22 receives rays of light from source 23 and focuses them on to the inner surface of semiconductor wafer 6 of cell 1 which is exposed to the electrolyte solution. It is at this point that the barrier regions exists in the semiconductor. The spectrum of the light from source 23 must be such that its photons have sufficient energy to cause the generation of excess carriers within the semiconductive material, which in turn will develop a potential difference between the electrolyte and the semiconductor by virtue of the separation of the carriers by the barrier field present at the rectifying junction. Rod 10 may be displaced to one side within container 1 so as not to obstruct the light from lens 22 in its passage to wafer 6. The light from source 23 may be chopped (interrupted or varied) at a frequency rate so that the photovoltage can be coupled into an A.C. amplifier or other logic circuit. It should also be mentioned that source 23 and lens 22 could be placed on the opposite side of cell 1 so as to illuminate the semiconductor outer surface at a point away from the potential barrier region. However, for reasons not given here, this configuration would probably result in a lower maximum photovoltage and also a reduced frequency response.

In the embodiment shown in FIGURE 4, the primary characteristic of the cell to be enhanced is that of photovoltage. As mentioned previously, the specific materials used in the cell of FIGURE 2 may also generate a slight photovoltage at its terminals. However, in a preferred embodiment, the semiconductor material in the cell of FIGURE 4 may consist of the intermetallic compound of $CdAs_2$ while electrolyte 15 may be an 8% (by volume) solution of sulfuric acid in distilled water. It is to be noted that these specific materials cause the generation of a photovoltage which may be effectively measured by some form of well known meter 24 or conventional cathode ray oscilloscope, placed in series circuit with the cell during interrogation time. It has further been noted that germanium may also be employed as the semiconductor in the above combination. Rod 10 may be made of platinum so as to make good contact with electrolyte 15 or it may be of some other form of inert material for accomplishing this function. However, the above specifically identified materials are not to be construed as being the only ones to result in an effective photovoltaic memory cell.

Depending upon the direction of the electric field and thus the direction of the forming current last applied to the cell, the condition of its interface will be in one of two states. Any subsequent illumination of the interface by means of light source 23 will develop a potential difference across conductors 9 and 15 measurable by meter 24 now in circuit. If the negative pole of battery 11 is connected to rod 10, a relatively high photovoltaic signal is subsequently developed, while the application of a positive voltage to rod 10 results in a little or no photovoltage being subsequently produced. For example, the forming of the interface by connecting the cell across a battery 11 of 9 volts for a few seconds yields an interface condition which produces a photovoltaic signal of 50 millivolts, characterized by a rise time of 10 microseconds and a decay time of 25 microseconds when subsequently illuminated with the light from a 6 volt filament bulb chopped at 2500 cycles per second. The signal thus produced is independent of the chopping rate, at least up to this value. Over a period of several hours, the signal increases up to a stable value of 80 millivolts even with interrogation continuing during this time. When the forming operation is carried out with a 9 volt battery 12, the photovoltaic signal is reduced to 0.2 millivolt which eventually may increase after a period several hours to 0.6 millivolt. The device thus performs as a bi-stable memory unit characterized by photovoltages of 50 and 0.5 millivolts in the two states, respectively. These characteristics will be retained for at least several days. It may therefore be appreciated that a cell constructed according to the principles herein described may be utilized in memory systems for data processing equipment in which the binary system of notation is employed.

The fourth method of interrogating the surface state of the semiconductor in the basic electrolytic cell of the invention is shown in FIGURE 5. This method consists in illuminating the semiconductor wafer 6 in order to determine its absorption characteristics, particularly with regard to the long wavelength side of the absorption edge. A brief description of light absorption in semiconductor material appears to be in order at this time so as to better understand the operation of the device shown in FIGURE 5. Generally, light photons having a frequency lower than that necessary to create electron-hole pairs in a particular semiconductor material will pass completely therethrough without being absorbed. However, as the frequency of the radiation increases, its energy content also increases according to the equation $e=hf$. Those photons having energy sufficient to create electron-hole pairs completely disappear, since their energy is absorbed and transmitted to the electron raised to the valence band. Generally, then, the higher the light frequency, the more absorption within the semiconductive material and consequently the less light transmitted through the material to emerge on its opposite side. It has been known that the application of an electrical field across the semiconductor produces a change in its absorption coefficient (i.e., the percentage of light absorption) for radiation on the long wavelength side of the absorption edge. The long wavelength side of the absorption edge refers to the minimum or threshold frequency necessary to raise an electron across the energy gap. The generation of an electric field in a semiconductor due to a biasing source is analogous to the production of an electric field caused by the surface potential barrier present across the contact between two dissimilar materials. The application of a strong field across a semiconductor in effect decreases its forbidden gap and so increases its absorption coefficient for the longer wavelengths of light. Since the magnitude of the barrier field depends to a great extent upon the surface condition, it is evident that a change in surface condition will affect the absorption coefficient on the long wavelength side of the absorption edge. Therefore, by determining the value of the absorption coefficient for light frequencies near the threshold value, the state of the semiconductor surface may be ascertained and thus, in the electrolytic cell of the present invention, its binary contents determined. It is also to be noted that by varying the electric field across the cell a modulation of the light transmitted therethrough may be accomplished.

In FIGURE 5, an optical interrogating source is provided external to the cell consisting of condensing lens 25 together with a light source 26. Rays from, preferably, a monochromatic source 26 are focused on to semiconductor wafer 6 of electrolytic cell 1. The wavelength of light source 26 should be such that it approaches the threshold limit of the absorption edge for the semiconductor. The amount of light transmitted through semiconductor wafer 6 from source 26 thus depends upon the magnitude of the absorption coefficient which in turn depends upon the surface state of the semiconductor. A detector 27 is positioned on the side of wafer 6 opposite to that of source 26 in order to detect the magnitude of the emerging radiation therefrom. Its output may be coupled to an amplifier or other circuit 28. The detector 27 should be responsive only to the light emerging from semiconductor 6 and so must in some well known manner be shielded from direct response to light from source 26.

In operation, information is first stored into the cell by means of a forming current in one direction or the other in accordance with the selection of switch 13. Thereafter, the forming current is terminated and the cell subsequently read out by the optical interrogation means. If the surface condition is such that the absorption coefficient for the threshold wavelengths is relatively high, then little or no light from source 26 will emerge from wafer 6 to be detected by 27. On the other hand, if the surface condition of wafer 6 is such that the absorption coefficient for the wavelength is relatively low, then little light will be absorbed in the wafer thus allowing the transmission therethrough in order to energize detector 27. As noted previously, the forming current need not be present during interrogation, and the readout is nondestructive in that the absorption coefficient of semiconductor wafer 6 remains in its last determined state until a forming current of reverse direction is applied to the electrolytic cell. The light source 26 and detector 27 also may be reversed in position such that they occupy the positions shown in FIGURE 2. In other words, the illuminating light may be focused on either surface of semiconductor wafer 6 just so long as the detector 27 is positioned adjacent the opposite surface and shielded from being directly responsive to source 26. Thus, the optical transmission characteristics of the cell in FIGURE 5 may be used to determine the binary content thereof as represented by the surface state of the semiconductor.

The semiconductor material used for the cell of FIGURE 5 should preferably be one characterized by having the lowest possible energy minimum in the conduction band and the highest possible energy maximum in the valence band for the same value of $k$ in momentum space, i.e., a material where the absorption process does not necessitate the cooperation of phonons. In other words, there should be no need for any change in electron momentum (or at most, merely a slight change) in order to produce electron-hole pairs. One such a material, for example, is that of gallium diarsenide. No specific kind of electrolyte is required.

When the cell of FIGURE 5 is used as a light modulator, the direction of the forming current thereacross may be rapidly and repeatedly reversed, such that the rapidly changing surface state of the semiconductor-electrolyte interface results in a varying magnitude of long wavelength light passing through the cell. Therefore, modulation and/or chopping functions may be performed by this embodiment, as well as a bistable memory function. The rapid reversal of the forming current may be done by any one of a number of well known switching means 30 in the art, such that armature 13 is alternately placed in circuit with batteries 12 and 11.

It should be appreciated that any one of the electrolytic cells constructed according to principles herein described may be utilized in computer memory systems. For example, a number of miniature cells of the above types can be mounted in an array or matrix. A biasing potential of one polarity or the other can then be selectively and randomly applied to each cell for a brief period of time in order to change the semiconductor surface state to one or the other condition so as to represent a binary bit of information. The individual state of each of these cells can then be subsequently read by traversing the matrix element with a fine spot of light, as, for example, from a cathode ray oscilloscope. The state of a cell may then be indicated by either its degree of photoluminescence, photovoltage, or optical transmission, which may be converted into an electric signal by an appropriate detector or detectors. Conversely, in an interrogation system other than optical such as is shown in FIGURE 3, means may be employed to determine the internal resistance of each of the momery cells. These readings are non-destructive in nature, i.e., the state of each cell is not changed by the process of interrogation. Therefore, each cell can be read as many times as desired without destroying its information.

While particular embodiments of the invention have been shown, it will be understood that the invention is not limited thereto since many modifications may be made, and it is, therefore contemplated by the appended claims to cover any such modifications as fall within the true spirit and scope of the invention.

What is claimed is:

1. A memory device comprising: semiconductor material having a surface, an electrolyte in contact with at least a portion of said surface to form an interface therebetween, and means for reversibly changing the state of said surface portion to a plurality of conditions.

2. A memory device according to claim 1 in which said changing means comprises means for passing a D.C. forming current in either direction across said interface.

3. A memory device according to claim 2 wherein said semiconductor material is germanium and said electrolyte is a liquid solution of cadmium chloride.

4. A memory device according to claim 2 wherein said semiconductor material is germanium and said electrolyte is a liquid solution of sulfuric acid.

5. A memory device according to claim 2 wherein said semiconductor material is cadmium arsenide and said electrolyte is a liquid solution of sulfuric acid.

6. A memory device according to claim 2 wherein said semiconductor material is gallium diarsenide.

7. A memory device comprising: semiconductor material having a surface, an electrolyte in contact with at least a portion of said surface to form an interface therebetween, means for reversibly changing the state of said surface portion to a plurality of conditions, and means for determining the condition of said surface portion after operation of said changing means.

8. A memory device according to claim 7 wherein said changing means comprises means for passing a D.C. forming current in either direction across said interface.

9. A memory device according to claim 8 in which said condition determining means comprises means for illuminating said surface portion with light and a detector for sensing the degree of a certain characteristic of said semiconductor material exhibited in response to said illumination.

10. A memory device according to claim 9 wherein said detector senses the degree of photoluminescence.

11. A memory device according to claim 9 wherein said detector senses the degree of photovoltage across said interface.

12. A memory device according to claim 9 wherein said detector senses the degree of light frequency absorption on the long wavelength side of the spectrum.

13. A memory device according to claim 8 wherein said condition determining means comprises means for reverse biasing said interface and a detector for sensing the impedance thereacross.

14. A memory device according to claim 10 wherein said semiconductor material is germanium and said electrolyte is a liquid solution of cadmium chloride.

15. A memory device according to claim 11 wherein said semiconductor material is germanium and said electrolyte is a liquid solution of sulfuric acid.

16. A memory device according to claim 11 wherein said semiconductor material is cadmium arsenide and said electrolyte is a liquid solution of sulfuric acid.

17. A memory device according to claim 12 wherein said semiconductor material is gallium diarsenide.

18. A device according to claim 12 wherein said changing means is cyclically operated so as to modulate the long wavelength light passing therethrough.

19. A binary information storage cell comprising a transparent container containing a transparent liquid electrolyte, a first electrode having one end immersed in said electrolyte, a second electrode disposed across an aperture in said container and having one surface thereof in contact with said electrolyte, means connected between said second electrode and the other end of said first electrode for reversibly passing direct current through said surface to change the rate of the surface recombination of carriers freed by subsequently absorbed light, said rate being changed from a relatively high rate to a relatively low rate in accordance with the direction of said current passing through said surface, means to direct light through said container and said electrolyte to impinge upon said surface, and means to detect the resultant photoluminescence of said second electrode.

References Cited in the file of this patent

UNITED STATES PATENTS

| | | |
|---|---|---|
| 2,743,430 | Schultz et al. | Apr. 24, 1956 |
| 2,912,592 | Mayer | Nov. 10, 1959 |
| 2,962,595 | Henisch | Nov. 29, 1960 |

OTHER REFERENCES

A. R. Moore and W. M. Webster: "The Effective Surface Recombination of a Germanium Surface With a Floating Barrier," Proc. I.R.E., vol. 43, pp. 427–435, April 1955.